(12) United States Patent
Pace et al.

(10) Patent No.: US 10,531,062 B2
(45) Date of Patent: Jan. 7, 2020

(54) STEREOGRAPHIC CINEMATOGRAPHY METADATA RECORDING

(76) Inventors: Vincent Pace, Shadow Hills, CA (US); Patrick Campbell, Stevenson Ranch, CA (US)

(*) Notice: Subject to any disclaimer, the term of this patent is extended or adjusted under 35 U.S.C. 154(b) by 820 days.

(21) Appl. No.: 12/578,416

(22) Filed: Oct. 13, 2009

(65) Prior Publication Data

US 2011/0085025 A1 Apr. 14, 2011

(51) Int. Cl.
| | | |
|---|---|---|
| *H04N 9/82* | (2006.01) | |
| *H04N 13/189* | (2018.01) | |
| *H04N 13/178* | (2018.01) | |
| *H04N 5/765* | (2006.01) | |
| *H04N 5/77* | (2006.01) | |
| *H04N 5/781* | (2006.01) | |
| *H04N 5/85* | (2006.01) | |
| *H04N 5/907* | (2006.01) | |
| *H04N 9/806* | (2006.01) | |

(52) U.S. Cl.
CPC ......... *H04N 9/8205* (2013.01); *H04N 13/178* (2018.05); *H04N 13/189* (2018.05); *H04N 5/765* (2013.01); *H04N 5/77* (2013.01); *H04N 5/781* (2013.01); *H04N 5/85* (2013.01); *H04N 5/907* (2013.01); *H04N 9/8063* (2013.01); *H04N 9/8227* (2013.01)

(58) Field of Classification Search
CPC .. H04N 21/84; H04N 1/6058; H04N 21/4828; H04N 5/232; H04N 5/23212; H04N 5/235; H04N 9/67; H04N 13/239; H04N 13/246; H04N 13/296; H04N 19/30; H04N 19/463; H04N 19/85; H04N 21/2187; H04N 21/222; H04N 21/23614; H04N 21/26208; H04N 21/4334; H04N 21/4348; H04N 21/8456; H04N 21/8543; H04N 7/18; H04N 13/122; H04N 13/161; H04N 13/178; H04N 13/189; H04N 13/194; H04N 13/254; H04N 13/324; H04N 13/344; H04N 13/366; H04N 19/46; H04N 19/98; H04N 1/387; H04N 1/3873; H04N 1/6011
USPC ........................................................ 348/49
See application file for complete search history.

(56) References Cited

U.S. PATENT DOCUMENTS

| | | | |
|---|---|---|---|
| 6,501,911 B1 * | 12/2002 | Malloy Desormeaux .... | 396/311 |
| 6,831,729 B1 | 12/2004 | Davies | |
| 7,200,320 B1 | 4/2007 | Denecke | |
| 7,289,717 B1 | 10/2007 | McGrath et al. | |

(Continued)

FOREIGN PATENT DOCUMENTS

WO    WO 03/014949    2/2003

OTHER PUBLICATIONS

Unknown, "Dcode TS-C", Article, Jun. 2005, 2 pages, Denecke, Inc.

(Continued)

*Primary Examiner* — Djenane M Bayard
(74) *Attorney, Agent, or Firm* — Susan L. McCain; Hankin Patent Law, APC

(57) ABSTRACT

There is disclosed a system, method, and computing device for recording a cinematic production. The system may include a video camera, a video recorder that records image signals generated by the video camera on a video recording medium, and a metadata writer. The metadata writer may store metadata relating to operating parameters of the video camera on a metadata storage medium.

12 Claims, 5 Drawing Sheets

(56) References Cited

U.S. PATENT DOCUMENTS

| | | | |
|---|---|---|---|
| 7,366,406 | B2 | 4/2008 | Hoshino et al. |
| 7,460,149 | B1 | 12/2008 | Donovan et al. |
| 2004/0249861 | A1 | 12/2004 | Hoshino et al. |
| 2006/0075441 | A1 | 4/2006 | Gauba et al. |
| 2007/0050321 | A1* | 3/2007 | Albert et al. ............ 707/1 |
| 2007/0139612 | A1 | 6/2007 | Butler-Smith |
| 2007/0140673 | A1 | 6/2007 | Butler-Smith et al. |
| 2008/0201299 | A1* | 8/2008 | Lehikoinen et al. ........ 707/3 |
| 2009/0006474 | A1* | 1/2009 | Richardson et al. ...... 707/104.1 |
| 2009/0092311 | A1 | 4/2009 | Kim et al. |
| 2009/0231492 | A1 | 9/2009 | Wayne et al. |
| 2010/0042650 | A1* | 2/2010 | Roenning et al. ........ 707/104.1 |

OTHER PUBLICATIONS

Hurwitz, Matt, "Dreaming in 3D", CineGear Expo News, The Official CineGear Expo Show Newspaper, Jun. 3-5, 2005, pp. 23-24.

World Intellectual Property Organization, International Search Report and Written Opinion for International Application No. PCT/US2010/052030, dated Dec. 13, 2010, pp. 1-11.

* cited by examiner

Metadata recorded for each take
- Timecode in (start)
- Timecode out (stop)
- Date
- Roll name
- Scene name
- Take number
- Comments
- Visual effects shot name
- Tracking camera
- Camera frame rate
- Camera model number
- Lens model number
- Summary of frame data
- Circle take Tag (to indicate take was good)
- Rehearsal Tag (to indicate take was a rehearsal)
- Tail slate tag (to indicate the take was marked at the end)
- CDL/LUT filename and file Metadata recorded for each frame
- Lens focus distance
- Lens focal length
- Lens iris setting
- Convergence angle*
- Interocular distance*
- Camera pointing data (pan/tilt/roll)
- Camera position data (height from floor, crane position, etc.)

* Stereographic cameras only

Data displayed on digital slate
- Roll name
- Scene name/number
- Take number
- Time code
- Other time-multiplexed metadata

FIG. 2

STEREOGRAPHIC CINEMATOGRAPHY METADATA RECORDING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to cinematography and, in particular, to stereographic recording of three-dimensional motion pictures.

Description of the Related Art

Historically, cinematic recording was done using film cameras to record visual images and tape recorders or other audio recording devices to record the accompanying sound. The overall cinematic production was divided into individual scenes, and each scene was typically recorded repeatedly, with each recording referred to as a "take". A device commonly called a "slate" or "clapperboard" was used to document, or "mark", each "take" to ensure that the image and sound recordings could be properly synchronized. To begin recording a take, information identifying the particular scene and take was written on the slate and the slate was placed in front of the film camera. With the film camera and the audio recorder running, an operator would read the content of the slate aloud to transfer the content of the slate to the audio recording. The operator would then close a bar, or "clapper", pivotally attached to the slate to produce both a visual image and a distinct clapping sound. Subsequently, a film editor would synchronize the audio and image recordings by manually locating the image frame where the clapper closed and manually adjusting the playback of the audio recording such that sound of the clapper was coincident with the image of the clapper closing.

While modern video recorders are fully capable of recording multiple audio channels, the image and audio portions of a cinematic production are commonly recorded on separate devices to allow independent processing, editing and augmentation. The technique for synchronizing the audio and video recording has evolved. Current, a single device (typically an audio recorder) provides a time code which is embedded in each audio recording. The time code is also provided to the slate, commonly by a wireless link. The running time code is displayed on the slate prior to the start of recording. The displayed time code is frozen for a few seconds when the clapper is closed, such that the image recording captures the exact time code when the clapper was closed. To synchronize the image and audio recordings, an editor manually locates the first image frame showing the clapper closed and then provides the captured time code to the audio recorder or recorders. Modern cinematic slates may also allow information defining the scene, take, and other parameters to be entered and displayed electronically.

In some cases, a take may be "tail marked", which means the take is marked after the recording is finished. In this case, the slate is conventionally held upside down in front of the camera to ensure that the "tail mark" cannot be confused with the mark for the next take recorded.

Descriptive information relating to each take is conventionally recorded in a log and/or a "camera sheet". The descriptive information may be recorded on paper or through manual data entry to a computing device.

DESCRIPTION OF THE DRAWINGS

FIG. 2 is a table of metadata.

Throughout this description, elements appearing in block diagrams are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
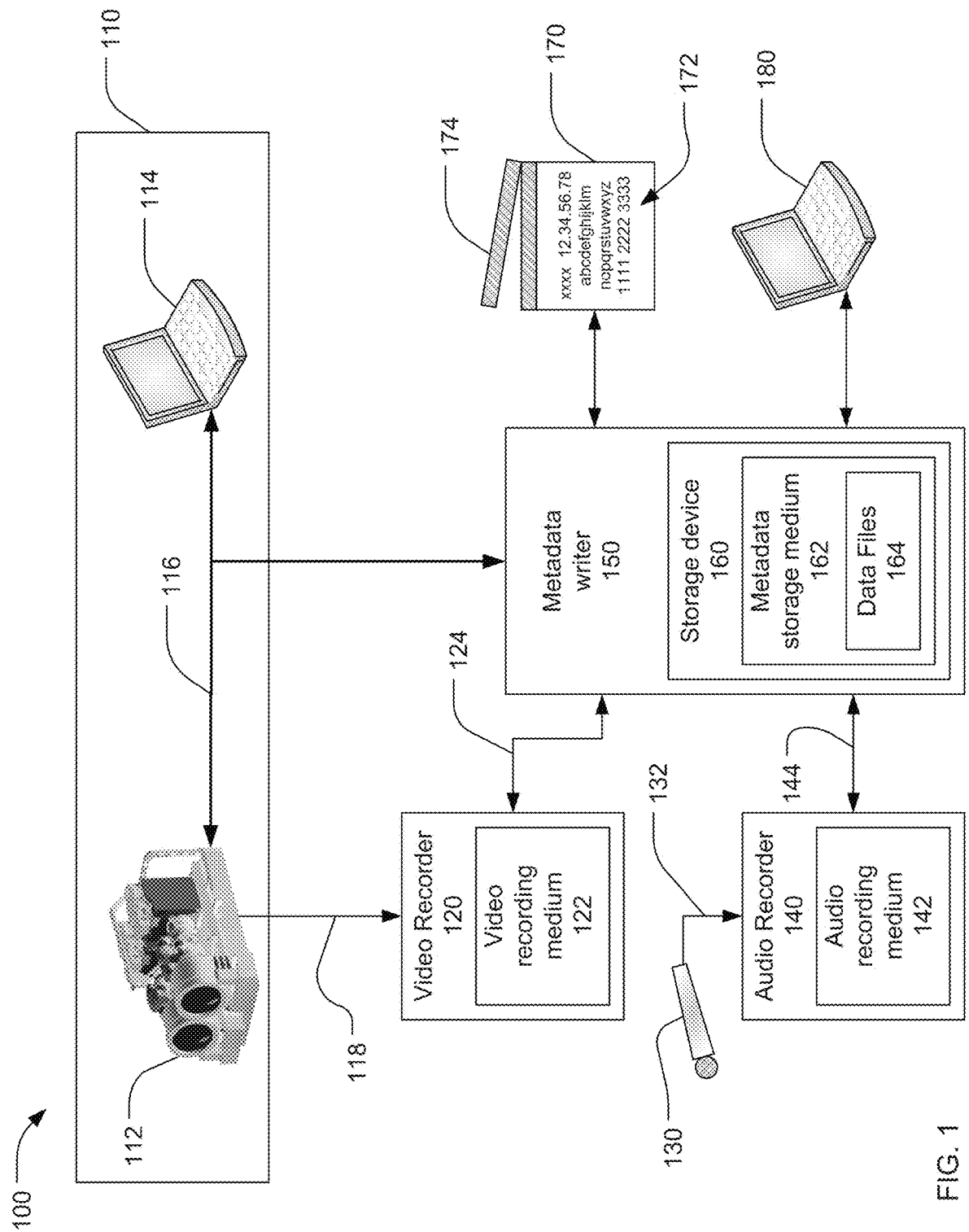
FIG. 1 is a block diagram of a cinematic recording system.

Referring now to FIG. 1, a cinematic recording system 100 may include a camera system 110 that provides an image signal 118 to be recorded by a video recorder 120. The camera 110 may include a camera head 112 and an operator interface 114. The term "image signal" encompasses both analog and digital signals and/or data that may be transmitted optically, wirelessly, or through a wired connection. The image signal 118 may include a large plurality of time-sequential video frames to be recorded by the video recorder 120. The cinematic recording system 100 may also include at least one microphone 130 that provides at least one audio signal 132 to be recorded by an audio recorder 140. In some cases, the video recorder 120 and the audio recorder 140 may be the same unit.

The cinematic recording system 100 may include a metadata writer 150 that may store metadata relating to each video frame and each take in a metadata storage device 160. In this patent, the term "metadata" has a broad meaning of "data about other data", and encompasses any data that describes what is being recorded by the audio and video recorders and how the information being recorded was created. The metadata writer 150 may also control, at least in part, the operation of the video recorder 120 and the audio recorder 140.

The video recorder 120 may record the image signal 118 on one or more removable video storage medium 122. For example, the video recorder 120 may be one or more high definition video cassette recorder that records the mage signal 118 on a removable cassette of magnetic recording tape. The video recorder 120 may record the image signal 118 on another type of removable storage media such as an optical disc, a removable hard drive, or a removable solid-state memory module such as a P2 (Professional Plug-in) card. In all cases, a single video storage medium will be referred to as a "roll", regardless of the physical configuration of the medium. The total amount of image data to be recorded for one cinematic production may exceed the capacity of a single roll, such that the roll may have to be changed one or more times while recording the cinematic production.

The audio recorder 140 may record the audio signal 132 on a removable audio recording medium 142. The removable audio recording medium 142 may be digital or analog recording tape, a removable optical disc, a removable hard drive, or a solid state device such as a flash memory card. The video recording medium 122 in the video recorder 120 and the audio recording medium 142 in the audio recorder 140 may be changed at the same time such that the video and audio recording media can remain together throughout the post production processes. When the audio recorder 140 and the video recorder 120 are the same unit, the audio signal may be recorded on the video recording medium.

The camera system 110 may include a camera head 112 coupled to an operator interface 114. The operator interface 114 may be a computing device, as illustrated in FIG. 1, a dedicated control panel, or a plurality of controls distributed among multiple devices. A computing device as used herein refers to any device with a processor, memory and a storage device that may execute instructions including, but not limited to, personal computers, server computers, computing tablets, telephones, personal digital assistants (PDAs), portable computers, and laptop computers. The operator interface 114 may be wholly or partially integrated into the camera head 112. The operator interface 114 may be adapted for operation by a single cameraman or by a plurality of operators.

The camera head 112 may be a conventional or high definition video camera that provides an image signal 118 representing a two-dimensional (2D) image. The operator interface 114 may provide for setting and/or monitoring various operating parameters of the camera head 112 such as a focal length of the camera lens and a focus distance of the camera lens. The operator interface 114 may also provide for setting or monitoring the geometric orientation of the camera head 112, where the phrase "geometric orientation" encompasses both the pointing direction (for example, defined by roll, pan, and tilt angles) and physical position such as height above the floor, camera crane location, and other positional information. All or portions of the operator interface 114 may be coupled to the camera head 112 through a camera data bus 116. Data indicating some or all of the operating parameters and geometric orientation of the camera head 112 may be available via the bus 116.

The camera head 112 may be a stereographic, or 3D, camera head that includes left and right cameras with associated left and right lenses, as shown in FIG. 1. In this case, the operator interface 114 may also provide for setting and/or monitoring various operating parameters specific to a stereographic camera head such as an interocular spacing between the left and right cameras, a convergence angle between the left and right cameras, and other parameters.

The camera head 112 may be an integrated 2D/3D camera head including a 2D camera head aligned with a stereographic camera head. In this case, the operator interface 114 may provide for setting and/or monitoring various operating parameters of both the 2D and stereographic camera heads.

The image signal 118 may include one signal or a plurality of signals. The image signal 118 may include separate RGB and/or $YP_RP_B$ analog signals or $YC_RC_B$ digital signals for a 2D camera head and/or separate RGB and/or $YP_RP_B$ analog signals or $YC_RC_B$ digital signals for each of the left and right cameras of a stereographic camera head. The image signal 118 may include separate HDMI or DVI digital signals for a 2D camera head and/or each of the left and right cameras of a stereographic camera head. The video recorder 120 may include a recorder to record the image signal 118 from a 2D camera and/or a single recorder or separate left and right recorders to record image signals from each of the left and right camera of a stereographic camera head. The video recorder 120 may record the image signal 118 in compressed or uncompressed formats.

The metadata writer 150 may receive data indicating the operating parameters and geometric orientation of the camera system 110 via a connection to the camera head 112, the operator interface 114, and/or the data bus 116. The metadata writer 150 may communicate command and control information 124, 144 with the video recorder 120 and the audio recorder 140, respectively. For example, the metadata writer 150 may output a command to the video recorder 120 and the audio recorder 140 to begin recording and may receive a response from one or both recorders indicating that recording has started.

The cinematic recording system 100 may include a digital slate 170. The digital slate 170 may include a display 172 to display time code information and descriptive information to be captured by the video camera system 110 when each take is marked. The digital slate 170 may include a manually actuated "clapper" 174 to mark each take. The metadata writer 150 may communicate take information with the digital slate 170. For example, the metadata writer 150 may send information, such as a scene name, a take number, and a time code, to be displayed on the digital slate 170. The metadata writer 150 may generate the time code or may receive the time code from another unit such as the audio recorder 140, a time code generator (not shown), or master clock (not shown). The metadata writer 150 may receive information from the digital slate 170 indicating that the clapper 174 has been closed and the take has been marked.

The information displayed on the digital slate 170 may include at least some of the operating parameters of the video camera system 110. Some of the information displayed on the digital slate 170 may be time-multiplexed such that that the displayed information may be captured by the camera system 110 and recorded on the video recorder 120. For example, specific metadata items may be displayed sequentially, with each item presented on the display 172 for a time interval equal to three video frames (about ⅛ of a second). Metadata presented in this manner may not be intelligible to human operators by may still be recovered from specific frames recorded on the video recorder 120. Recording time-multiplexed metadata on the video recorder 120 may provide some degree of redundancy in the event that the metadata stored by the metadata writer 150 is lost, inadvertently erased, damaged, or otherwise unavailable.

The metadata writer 150 may interface with an input/output unit 180 which may be a computing device, as shown in FIG. 1, or may be a combination of a display device (not shown) and one or more input devices (not shown) such as a keyboard and/or mouse. The input output unit 180 may be used to input information such as roll and scene names, comments, and other information, into the metadata writer 150.

The metadata writer 150 may be coupled to or include a storage device 160 that is either removable or contains a removable storage media. The storage device 160 may include a removable magnetic storage medium 162 such as a floppy disk, a compact disk (CD), or a digital versatile disk (DVD). The storage device 160 may be a removable non-volatile storage medium 162 such as a flash drive, a memory stick, or a memory card such as a PCMCIA (personal computer memory card international association) card, a CF (compact flash) card, an SM (smart media) card, an SD (secure digital) card, or some other memory device.

The metadata writer 150 may cause metadata relating to each take to be stored on the metadata storage medium 162. Metadata relating to a plurality of takes may be stored on the metadata storage medium 162 as a corresponding plurality of data files 164. Each data file may be for example, an XML (extensible markup language) file or an ALE (Avid Log Exchange—a file format used by Avid video editing equipment) file. Metadata may be stored on the metadata storage medium 162 in a hierarchical structure. For example, each removable metadata storage medium 162 may contain metadata relating to a corresponding roll of video recording medium, folders may correspond to specific scenes, and files within the folders may correspond to specific takes. When the roll of video recording medium 122 is changed, the corresponding metadata storage medium 162 may accompany the roll of video recording medium 122 throughout subsequent editing and post processing operations.

The metadata stored on the metadata storage medium 162 may include data describing each take and additional data describing each frame of video recorded during a take. FIG. 2 is a table listing an exemplary set of metadata parameters that may be stored on the metadata storage medium 162. Metadata stored once for each take may include time code data; information identifying the roll, scene, and take; information identifying equipment used in recording the take; comments; and tags such as a "circle take" tag indicating that a take was good, a rehearsal tag indicating that a take was a rehearsal, and a "tail slate" tag indicating the take was marked at the end rather than at the beginning. The metadata stored once for each take may also include a filename for a color decision list (CDL) or a look up table (LUT) to be used for correcting the color of the recorded image. The actual CDL or LUT may also be stored as a separate file on the metadata storage medium 162. Metadata stored for every video frame may include information defining the operating parameters and geometric orientation of the video camera head 112. FIG. 2 further provides an example of information that may be displayed on the digital slate 170 when a take is marked.

Figure 3:
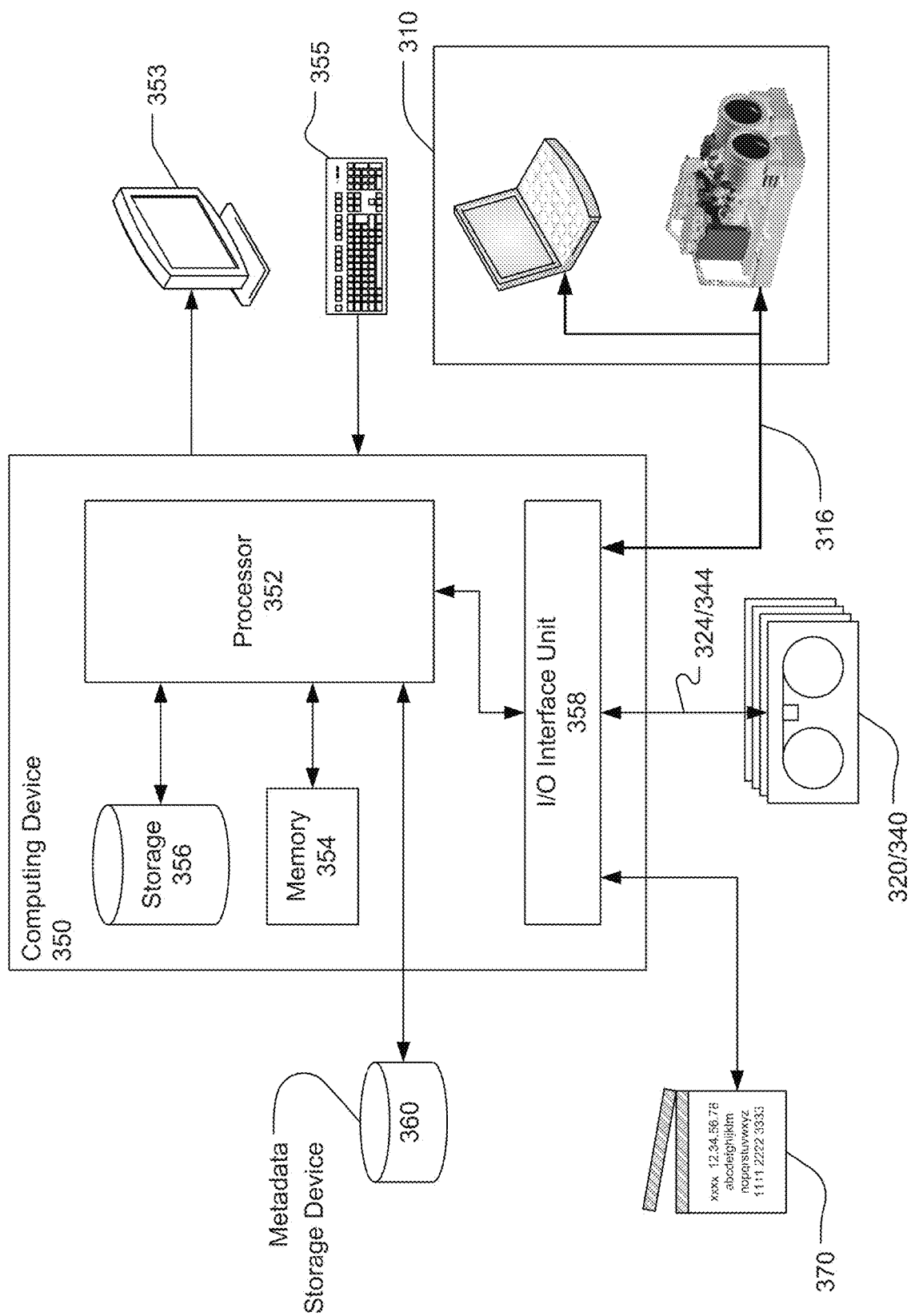
FIG. 3 is a block diagram of a metadata recording system.

FIG. 3 is a block diagram of a computing device 350 that may be suitable for the metadata writer 150. The computing device 350 may include hardware, firmware, and/or software adapted to perform the processes subsequently described herein. The computing device 350 may include a processor 352 coupled to memory 354 and a storage device 356.

The storage device 356 may store software programs including instructions which, when executed by the computing device 350, cause the computing device 350 to provide the features and functionality of the metadata writer 150. The storage device 356 may allow for reading from and/or writing to a storage medium. Storage devices include hard disk drives, DVD drives, flash memory devices, and others. Each storage device may accept a storage media. These storage media include, for example, magnetic media such as hard disks, floppy disks and tape; optical media such as compact disks (CD-ROM and CD-RW) and digital versatile disks (DVD and DVD±RW); flash memory cards; and other storage media.

The computing device 350 may include or interface with a display device 353 and one or more input devices such as a keyboard 355. The computing device 350 may include an input/output interface unit 358 to interface with external devices such as a digital slate 370, video and audio recorders 320/340, and a camera system 310 and/or a camera bus 316. The input/output interface unit 358 may include a combination of circuits, firmware, and software to interface with the external devices. The input/output interface unit 358 may communicate with each of the external devices via a network which may be a local area network, a wide area network, or the Internet; via one or more buses such as a USB bus, a PCI bus, a PCI Express bus, or other parallel or serial data bus; via one or more direct wired or wireless connections; or via a combination of these.

The computing device 350 may include software and/or hardware for providing functionality and features described herein. The computing device 350 may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the computing device 330 may include various specialized units, circuits, software and interfaces for providing the functionality and features described here.

The processes, functionality and features of the computing device 350 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 350 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 352 and others by other devices.

Description of Processes

Figure 4:
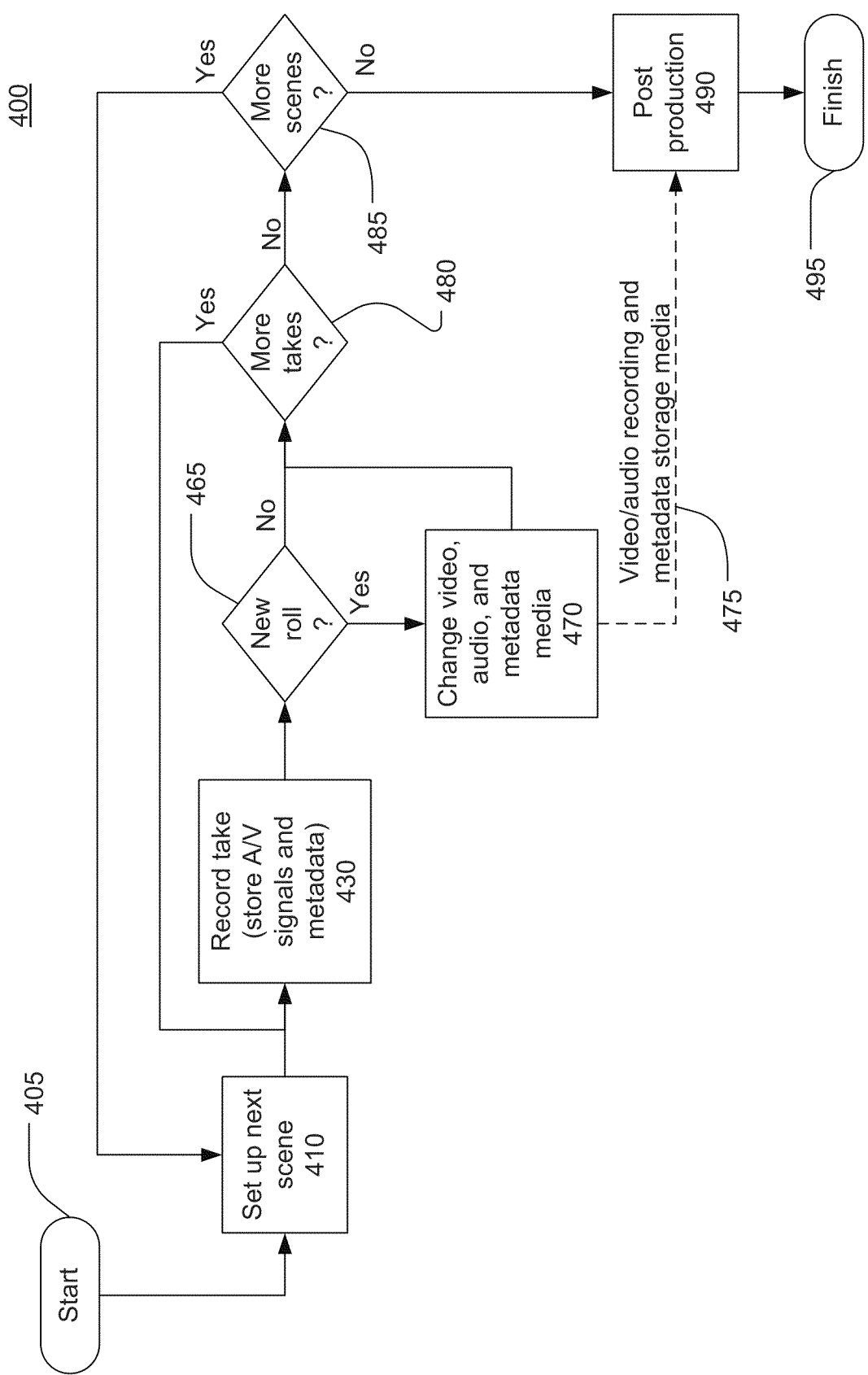
FIG. 4 is a flow chart of a process for cinematic recording.

FIG. 4 is a flow chart of a process 400 for recording a cinematic production. Although the flow chart has both a start 405 and an end 495, the process is cyclical in nature and the actions within the process may be repeated for each take of each scene of the cinematic production. For ease of discussion, the process 400 presumes that the recording of each scene will be finished before the recording of the next scene is started, and that completed scenes are not recorded again at some later time. In reality, multiple scenes may be recorded concurrently and completed scenes may have to be recorded again, for example due to changes in the cast or the script.

At the start of the process at 405, the resources, cast, crew, and equipment required for the cinematic production may be assembled in preparation for recording the first scene. The actions from 410 to 485 may be performed with respect to the first scene, and then repeated for each subsequent scene.

At 410, each scene to be recorded may be set up. Setting up the scene may involve preparing a location and disposing cast, crew, props, and equipment as needed to record the scene. When the scene is ready to be recorded, a take may be recorded at 430. Recording a take at 430 may include recording video signals from one or more cameras on one or more video recorders, recording audio signals from one or more microphones on one or more audio recorders, and storing metadata relating to the take and to each recorded video frame on a removable metadata storage medium. The metadata stored during each take may include metadata describing the take and metadata describing each recorded video frame. The metadata describing each video frame may include data defining the operating parameters and geometric orientation of the video camera. The metadata stored during each take may include, for example, some or all of the metadata identified in FIG. 2.

At 465, after recording each take, a determination may be made if a new "roll" is required. In order to record a take, all of the recording medium for the video image signals, the recording medium for audio signals, and the metadata storage medium must have sufficient remaining capacity to accommodate another take. A new roll may be required if the remaining capacity of any of the video, audio, or metadata recording media does not have sufficient remaining capacity. When a determination is made at 465 that a new roll is required, all of the video, audio, and metadata recording media may be replaced at 470 and the used media may be routed together to the post production processes at 490, as indicated by dashed line 475. In some circumstances, such as after the final take of the final scene, the recording media may not be replaced at 470.

A determination may be made at 480 if additional takes will be recorded for the same scene. If additional takes are to be recorded, the process may return to 430. If additional takes of the scene are not to be recorded, a determination may be made at 485 if additional scenes will be recorded. If additional scenes are to be recorded, the process may return to 410 to set up the next scene. If no additional scenes are to be recorded, which is to say the live recording portion of the cinematic product has been completed, the video, audio, and metadata recording media may be sent to the post production processes 490.

The post production processes 490 may include editing of the multiple takes of each scene and the integration of computer-generated images and other visual effects, sound effects, and other special effects. The creation and integration of computer-generated images and other visual special effects may be based, at least in part, on the metadata stored at 430. For example, the stored metadata may include information, such as camera geometric orientation, lens focus distance and lens focal length (plus interocular distance and convergence angle for a stereographic camera) necessary to allow computer-generated images and effects to be combined with 2D or stereographic video recordings of real-world scenes.

Figure 5:
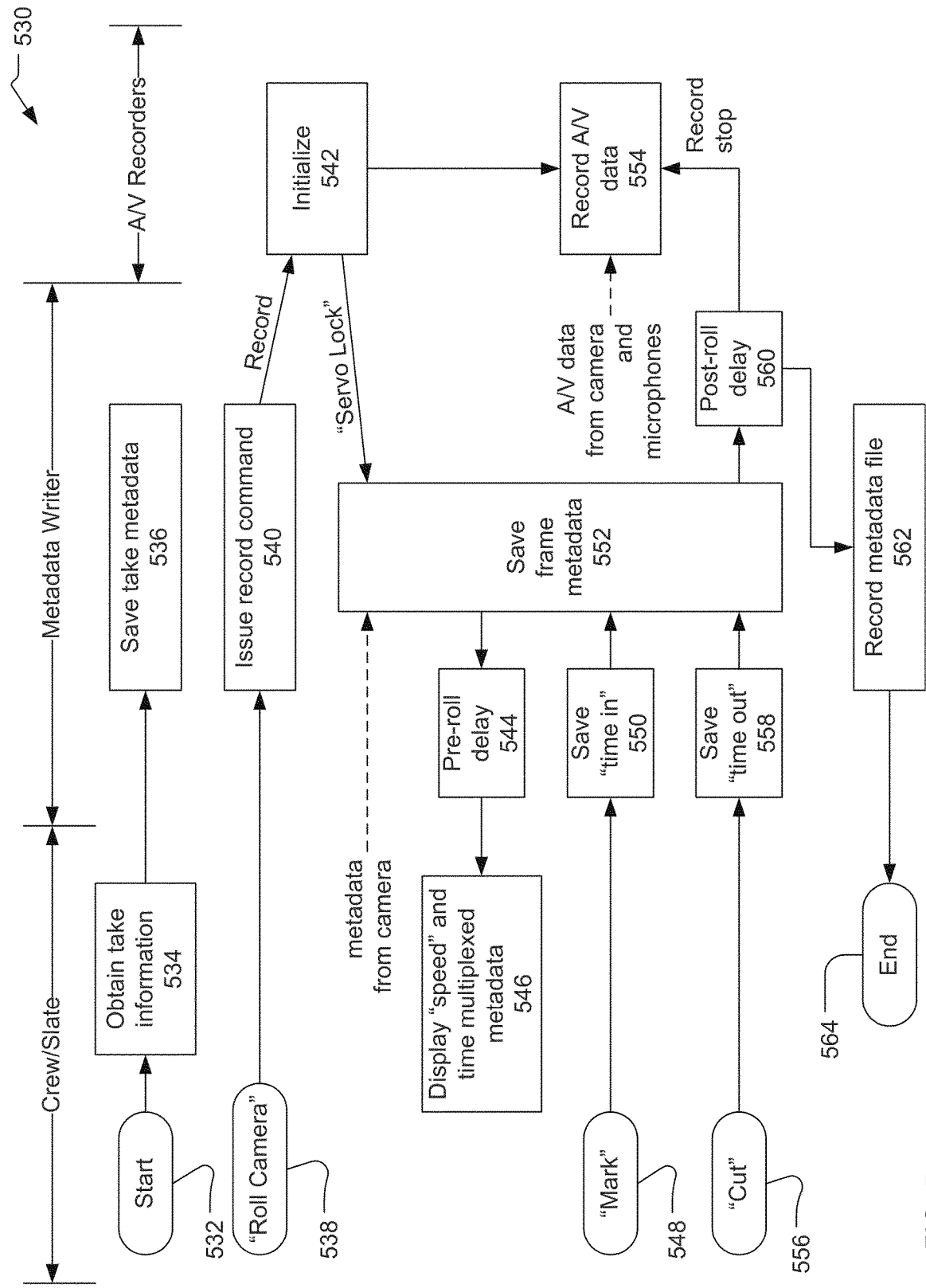
FIG. 5 is a flow chart of a process for recording a scene.

FIG. 5 is a flow chart of an exemplary process 530 for recording a take, which may be suitable for use at 430 in the process 400 for recording a cinematic production. The process 530 starts at 532 and ends at 564 and may be performed for every take recorded for the cinematic production. The exemplary process 530 assumes that the take is "marked" prior to recording the actual take.

At the start 532 the cast, crew, props, and equipment may be disposed as needed to record the take. At 534, information describing the take may be obtained for a metadata writer, such as the metadata writer 150. The information describing the take may include some or all of the metadata recorded for each take, as listed in FIG. 2. Some or all of the information describing the take may be entered by an operator via an interface such as the input/output unit 180. Some or all of the information describing the take may be uploaded via a network, retrieved from a prepared database of scenes, or obtained in some other manner. At 536, the information describing the take may be saved in a memory or storage device within or coupled to the metadata writer. The metadata writer may also cause some or all of the information to be displayed on a digital slate, such as the digital slate 170, to be used to mark the take. The digital slate may also display a time code generated by the metadata writer or by another device.

At 538, a "roll camera" command may be issued by an operator. For example, a cameraman or other operator may enter the roll camera command at the operator interface in response to a "roll camera" command issued verbally by a director. In response to the roll camera command, the metadata writer may issue a "record" command to one or more video and/or audio recorders at 540. The record command may be issued as a signal or message transmitted to each recorder over a wired or wireless communications channel.

Upon receipt of the record command, each recorder may perform any required initialization at 542. For example, a recorder using a moving or a rotating recording medium may have to start a motor drive system and wait until the recording medium is moving at the desired speed and synchronized, if required, with the signals to be recorded. Each recorder may issue a "servo lock" signal indicating when it is recording properly. The time period between the issuance of the record command by the metadata write to receipt of the servo lock signal from a recorder may be, for example, one to four seconds for a tape recorder, about one second for a disc recorder, and nearly instantaneous for a solid state recorder such as a P2 memory.

After servo lock signals are received from all recorders, the metadata writer may begin storing frame metadata at 552. Additionally, after a predetermined pre-roll delay at 544, the metadata writer may cause the term "speed" or another indication that the recorders are recording on the digital slate at 546. The predetermined pre-roll delay may be, for example, a few seconds. During the pre-roll delay, the recorders may record audio, video, and metadata information that can subsequently be used to synchronize editing equipment prior to the start of the actual take. At 546, the metadata writer may also cause time-multiplexed metadata to be displayed on the slate such that the metadata is captured on the video recorder prior to recording the take.

At some time after "speed" is displayed on the digital slates, an operator may issue a "mark" command at 548. For example, a cameraman or other operator may close a "clapper" on the digital slate in response to a "mark" command issued verbally by a director. At 550, the metadata recorder may receive a mark signal from the digital slate indicating the clapper was closed to mark the take. In response to the mark signal, the metadata recorder may freeze the information, including the time code, displayed on the digital slate such that the "time in" (the time code at the start of the take) can be captured by a camera and recorded on a video recorder. The metadata recorder may also save a "time in" value at 550.

Once the servo lock signal has been received from all recorders, audio/video signals from one or more cameras and one or more microphones may be recorded on the audio and video recorders at 554. Concurrently and in synchronism with the video recording, metadata relating to the operating parameters of each video camera for every video frame may be received and saved by the metadata writer at 552. Recording of audio/video signals at 554 and saving metadata at 552 may continue as the take is marked and throughout the duration of the take.

At the conclusion of the take, a "cut" command may be issued by an operator at 556 and received by the metadata recorder at 558. For example, a cameraman or other operator may enter the cut command at the operator interface in response to a "cut" instruction issued verbally by the director. In response to receiving the cut command, the metadata writer may save a "time out" at 558 and, after a predetermined "post roll" delay at 560, may issue a "record stop" command to the video and/or audio recorders. The post roll delay may be, for example, one or two seconds as required by post-production editing equipment.

At 562, the metadata recorder may store the accumulated saved metadata as a data file on a metadata storage medium. The data file may be for example, an XML file or an ALE file. The metadata stored on the metadata storage medium may include data describing the take and data describing each frame of video recorded during a take. As shown in FIG. 2, metadata stored once for each take may include time code data; information identifying the roll, scene, and take; information identifying equipment used in recording the take; comments; and a "circle take" field indicting if a take was good. Metadata stored for every video frame may include information defining the operating parameters and geometric orientation of the video camera head 112.

In some cases, it may not be practical to mark a take prior to recording, or the crew may simply forget to mark the take prior to recording. In these cases, the take may be "tail marked", which means the take is marked after recording. In this case, metadata, including time multiplexed metadata, may be displayed on the slate after 558 and recorded on the video recorders between 558 and 560. The slate is traditionally held upside down in front of the camera when a take is tail marked.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A cinematic recording system comprising:
   a video camera operable to generate a plurality of image signals;
   a video recorder operatively connected to the video camera, wherein the video recorder is operable to record at least a portion of the image signals generated by the video camera onto a video recording medium;
   a metadata writer operatively connected to the video camera, wherein the metadata writer is operable to store a plurality of metadata associated with operation of the cinematic recording system, wherein the plurality of metadata comprises (a) metadata relating to each scene and each take recorded by the video recorder onto the video recording medium and (b) metadata relating to at least one operating parameter of the video camera; and
   a digital slate operatively connected to the metadata writer, wherein the digital slate is operable to receive a plurality of metadata from the metadata writer for display thereon;
   wherein prior to recording each take of a scene, the metadata writer is operable to transmit metadata describing the take and the scene and metadata related to at least one operating parameter of the video camera to the digital slate for display thereon.

2. The cinematic recording system of claim 1, wherein the video camera is a stereographic camera.

3. The cinematic recording system of claim 2, wherein the metadata related to at least one operating parameter of the video camera comprises at least one of a convergence angle of the stereographic camera and an interocular distance of the stereographic camera.

4. The cinematic recording system of claim 1, wherein the metadata describing the take and the scene comprises at least one of a date, a roll name, a visual-effects shot name, a camera frame rate, a camera model number, and a lens model number.

5. The cinematic recording system of claim 1, wherein at least a portion of the metadata displayed on the digital slate is time multiplexed.

6. The cinematic recording system of claim 1, wherein at least a portion of the plurality of metadata is stored on a removable storage medium.

7. A method for recording at least one take of at least one scene via cinematic recording system, the cinematic recording system comprising
   a video camera operable to generate a plurality of image signals;
   a video recorder is operable to record at least a portion of the image signals generated by the video camera onto a video recording medium;
   a metadata writer operable to store a plurality of metadata associated with operation of the cinematic recording system; and
   a digital slate operable to receive a plurality of metadata from the metadata writer for display thereon, the method comprising:
   transmitting, from the metadata writer, a plurality of metadata to the digital slate, wherein the plurality of metadata comprises (a) metadata relating to each scene and each take recorded by the video recorder onto the video recording medium and (b) metadata relating to at least one operating parameter of the video camera;
   displaying the transmitted metadata on the digital display;
   commencing operation of the video camera to generate image signals for recording by the video recorder;
   prior to recording the at least one take, recording, via the video recorder, the metadata displayed on the digital slate; and
   after recording the metadata displayed on the digital slate, commencing recording of the at least one take.

8. The method of claim 7, wherein the video camera is a stereographic camera.

9. The method of claim 8, wherein the metadata related to at least one operating parameter of the video camera comprises at least one of a convergence angle of the stereographic camera and an interocular distance of the stereographic camera.

10. The method of claim 7, wherein the metadata describing the take and the scene comprises at least one of a date, a roll name, a visual-effects shot name, a camera frame rate, a camera model number, and a lens model number.

11. The method of claim 7, wherein at least a portion of the metadata displayed on the digital slate is time multiplexed.

12. The method of claim 7, wherein at least a portion of the plurality of metadata is stored on a removable storage medium.

* * * * *